United States Patent [19]

Seiden

[11] 3,751,265

[45] Aug. 7, 1973

[54] SHORTENING FOR HIGHLY AERATED CREAMY FROSTINGS

[75] Inventor: Paul Seiden, Cincinnati, Ohio

[73] Assignee: The Procter & Gamble Company, Cincinnati, Ohio

[22] Filed: Dec. 30, 1971

[21] Appl. No.: 214,484

[52] U.S. Cl. .................. 99/139, 99/123, 99/118
[51] Int. Cl. .............................. A23g 3/00
[58] Field of Search ..................... 99/123, 118, 139

[56] References Cited
UNITED STATES PATENTS

| 3,230,090 | 1/1966 | Weiss | 99/123 |
| 3,397,996 | 8/1968 | Darragh | 99/118 |
| 3,429,714 | 2/1969 | Nelson | 99/118 |
| 3,549,383 | 12/1970 | Menzies | 99/123 |
| 3,592,663 | 7/1971 | Brunner et al. | 99/139 |

Primary Examiner—Alvin E. Tanenholtz
Assistant Examiner—J. M. Hunter
Attorney—Richard C. Witte et al.

[57] ABSTRACT

A shortening for use in highly aerated creamy frostings comprises: (a) a liquid glyceride such as partially hydrogenated soybean oil, (b) propylene glycol monostearate, (c) partial esters of polyglycerol, and (d) polyoxyethylene sorbitan tristearate.

4 Claims, No Drawings

SHORTENING FOR HIGHLY AERATED CREAMY FROSTINGS

BACKGROUND OF THE INVENTION

This invention relates to a shortening which is capable of producing highly stable, highly aerated, creamy frostings. Frostings are coatings which can be applied to cakes, sweet rolls, cookies, pastries, and other baked goods and confections. Although the basic ingredients of frostings are well known to be sugar and water, the properties and characteristics of frostings can be modified by variation of the constituents and additives used in connection with the basic sugar and water. Certain types of frostings, generally known as "creamy" or "butter cream" icings, contain a substantial proportion of fat or shortening and can be blended to incorporate a certain amount of air. It is the customary practice to use a plastic shortening for preparing such creamy frostings since fluid shortenings generally do not provide the desired properties for this purpose. Frostings made with fluid shortenings tend to slump and bleed liquids, and do not have the air incorporation and/or stability properties of icings made with plastic shortenings.

Earlier attempts to prepare a shortening for use in creamy frostings have been successful. However, there is no teaching in the prior art of a stable creamy frosting which has the ability to incorporate air from about about 50 percent to about 120 percent of the ingredient volume to obtain frosting densities of as little as 0.4 to 0.6 grams/cubic centimeter, while maintaining or surpassing non-aerated creamy frostings in qualities such as texture, melt-in-the mouth properties, viscosity, and aging and heat stability. Low density makes the frosting highly economical and gives it a unique marshmallowy eating quality.

All-purpose shortenings for use in creamy frostings are disclosed in U.S. Pat. Nos. 3,397,996, Darragh and Nelson, All-Purpose Shortening Composition, patented Aug. 20, 1968; 3,429,714, Nelson, Bakers All-Purpose Plastic Shortening Composition, patented Feb. 25, 1969; and 3,549,383, Menzies, Fluid Shortening for Cakes and Cream Icings, patented Dec. 22, 1970. These patents do not show the particular combination of ingredients nor the concentrations at which they are utilized in accordance with the present invention. These patents also do not teach how to obtain a creamy frosting with a density of as little as 0.4 grams/cubic centimeter.

SUMMARY OF THE INVENTION

This invention provides a shortening for use in highly aerated, stable, creamy frostings, which comprises: (a) 5 to 12 percent propylene glycol monostearate, (b) 6 to 10 percent of partial esters of polyglycerol, (c) 1.5 to 4.0 percent of an emulsifier, such as polyoxyethylene sorbitan tristearate, and (d) 77.5 to 87.5 percent of a liquid glyceride base oil. The above additives cooperate to provide improved performance in the fluid shortening of this invention. More specifically, improvements are obtained in creamy frostings with the shortening of this invention which employs these four ingredients in combination as compared to similar type shortenings from which one or more of these additives is left out or modified as discussed in more detail below in regard to each additive. In other words, the present invention is not predicated on the use of these components in shortenings either alone or in binary or ternary combinations, but lies in the unique combination of all four components in the concentrations described and in the shortening improvements obtained with this combination.

When the above-described shortening comprises from about 10 to about 20 percent, preferably about 16.5 percent, of a dry frosting mix or from about 6 percent to about 15 percent of the total frosting ingredients, a highly desirable, stable, highly aerated creamy frosting can be produced. Such creamy frostings can have densities as low as 0.4 to 0.6 grams/cubic centimeter, while maintaining or surpassing the following qualities of a non-aerated creamy frosting: texture, melt-in-the-mouth properties, high viscosity, and aging and heat stability. The low density of the frosting makes it highly economical and gives it a unique marshmallowy eating quality.

DESCRIPTION OF THE PREFERRED EMBODIMENTS

The shortening of this invention is generally comprised of one or more fatty glyceride base oils or fats, but can also comprise a liquid vehicle and hardstock solids which are preferably suspended in the liquid vehicle. The shortening ingredients should be predominantly unsaturated and they can be, or can be derived from, naturally-occurring fats and oils as well as synthetically prepared glycerides or fractions or mixtures thereof. The Iodine Value should be in the range of 65 to 115. In general, these glycerides contain fatty acid groups having from about 12 to about 24 carbon atoms such as the fatty acid groups of palmitic, stearic, oleic, linoleic, and linolenic acids.

Examples of suitable base oils are cottonseed, soybean, peanut, corn, safflower, sesame, sunflower, and rapeseed oils. Cottonseed, peanut, corn, safflower, sesame, and sunflower oils do not have to be hydrogenated or fall within the above-described Iodine Value range. Fish oils such as herring, menhaden, and whale oil can also be used. Also suitable are liquid oil fractions obtained from palm oil, lard, and tallow, as for example, by graining or directed interesterification followed by separation of the oil. Oils predominating in glycerides of polyunsaturated acids may require some hydrogenation to maintain flavor, but the hydrogenation should be kept to a minimum.

Any mixture of the above enumerated glyceride vehicles can be used in preparing the shortenings of the present invention. Refined and partially hydrogenated soybean oil having an Iodine Value of 70 to 115 is preferred for use as the glyceride base oil in the shortening of this invention.

If present, the hardstock solids are preferably suspended in a liquid glyceride vehicle in the shortening of this invention, and are generally triglyceride solids which are preferably substantially fully saturated fatty triglycerides having from about 16 to about 22 carbon atoms. Preferably, these fatty triglyceride solids have an Iodine Value not greater than about 12, and more preferably have an Iodine Value of less than about 8. Preferably, the hardstock is beta-phase-tending, such as tristearin, tripalmitin, and symmetrical palmitodistearin. Other suitable triglyceride solids having strong beta-forming tendencies can be derived from substantially completely saturated fats and oils such as lard, sunflower oil, safflower oil, linseed oil, sesame seed oil, hazelnut oil, soybean oil, peanut oil, olive oil, and corn oil. In the present invention, the hardstock solids will generally comprise from about 0 percent to about 8 percent of the liquid glyceride oil.

The solid components of the fluid shortening such as triglyceride hardstock are preferably present primarily, at least 60 percent and more preferably at least 80 percent, in the beta-phase as opposed to an alpha-phase or a beta-prime phase. These crystalline structures can be identified by their X-ray diffraction patterns and are described in detail in U.S. Pat. Nos. 2,521,242, and 2,521,243, granted to Mitchell, Dec. 5, 1950. A beta-phase crystalline structure is desirable to enhance the fluidity characteristics of the shortenings and to promote the formation of a stable suspension of undissolved solids in a liquid triglyceride base oil.

The shortening contains from about 5 percent to about 12 percent, preferably from about 6 percent to about 8 percent, propylene glycol monostearate. If less than about 5 percent is used, the frosting is unacceptable because of low stability and viscosity. If more than about 12 percent is used, the eating quality of the frosting is impaired. Palmitic acid can substitute for 0 to 50 percent of the stearic acid in the propylene glycol monostearate with substantially equivalent results being obtained. Also, behenic acid can substitute for 0 to 15 percent of the stearic acid. These materials are normally solid and preferably, they have an Iodine Value of less than about 12 and more preferably an Iodine Value of less than 6.

The propylene glycol monostearate component can be prepared by a reaction of propylene glycol with stearic acid or commercial mixtures of acids to form the monostearate by direct esterification methods. By analogous methods, the propylene glycol can be interesterified with highly hydrogenated fats or oils having the proper fatty acid groups to form propylene glycol monostearate.

The propylene glycol monostearate component is important to the shortening as an alpha-phase crystal-tending emulsifier which assists in improving the stability of the creamy frosting.

The shortening contains from about 6 percent to about 10 percent, preferably from about 7 percent to about 9 percent of partial stearic acid esters of polyglycerol. Polyglycerol is essentially a polymer which is formed by the dehydration of glycerine. In the present invention, the polyglycerol should contain an average of from 6 to 12 glycerol units, preferably from 8 to 10. From 20 to 40 percent of the free hydroxyl groups should be esterified with stearic acid, although palmitic acid can substitute for 0 to 50 percent of the stearic acid and other fatty acids can substitute for small amounts of the stearic acid. If less than 6 percent of the esters are used, then proper aeration and stability cannot be obtained. 10 percent is a practical upper limit because the cost increases without a significant increase in aeration.

Decaglycerol tristearate is the preferred polyglycerol ester and it contains about 10 units of glycerol and about 3 stearic acid groups per molecule. It should be understood that in actual practice the decaglycerol ester will usually contain a mixture of components having an average of about 10 glycerol units and an average of about 2.4 to 4.8 stearic acid groups. Suitable methods of forming this ester are disclosed by Harris, U.S. Pat. Nos. 2,022,766 and 2.023,388, both granted Dec. 3, 1935.

The polyglycerol ester component is important to the shortening in improving the stability of the creamy frosting and in providing a high degree of aeration in the creamy frosting.

The shortening contains from about 1.5 percent to about 4.0 percent, preferably from about 2 percent to about 2.5 percent, of an emulsifier. If less than 1.5 percent is used, then there is not sufficient aeration. If more than 4.0 percent is used, then the frosting becomes unstable and has a bitter off flavor. Preferably, the emulsifier is polyoxyethylene sorbitan tristearate with a chain length of 5 to 20 oxyethylene groups, but mixtures of polyoxyethylene sorbitan monostearate with a chain length of 5 to 20 oxyethylene groups and sorbitan monostearate can partially or fully substitute for the polyoxyethylene sorbitan tristearate. If such a mixture is used, at least one-fourth of it should be comprised of the polyoxyethylene sorbitan ester compounds.

Polyoxyethylene sorbitan tristearate can be prepared, for example, by forming polyoxyethylene ethers of partial stearic acid sorbitan esters. Suitable methods of preparation are described by Griffith, U.S. Pat. No. 2,380,166, granted July 10, 1945. In a preparation of the mono- or tristearate of polyoxyethylene sorbitan, a complex mixture of compounds is usually formed. Such mixtures are included within the scope of this invention.

The polyoxyethylene sorbitan ester component is important to the shortening, particularly in regard to the volume of the frosting.

The shortening of this invention can be prepared by conventional processes known in the art. Such processes are described in *Bailey's Industrial Oil and Fat Products*, 3rd edition, edited by Daniel Swern, published in 1964 by Interscience Publishers, pages 265–316. For example, the components can be heated to a temperature above their melting points, combined, and rapidly cooled to room temperature.

The shortening of the present invention comprises from about 10 percent to about 20 percent, preferably about 16.5 percent of a dry prepared mix for the production of the aerated creamy frostings of the present invention. The shortening comprises 6 to 15 percent of the total frosting inredients. If less than 10 percent of the shortening is used, then proper aeration cannot be obtained. If more than 20 percent of the shortening is used, then proper stability cannot be obtained.

Besides the shortening, the creamy frosting comprises, by weight, from about 45 percent to about 75 sugar, such as sucrose, dextrose, or mixtures thereof, and from about 10 percent to about 25 percent water. Other ingredients such as flavoring, coloring, acidifying agents, salt, antioxidants, mold inhibitors, and hydrophilic colloids such as sodium carboxymethyl cellulose can be included in the creamy frosting of this invention.

The aerated creamy frostings of the present invention can be prepared by most conventional methods. A preferred method is shown in the following examples.

The creamy frostings of the present invention are very highly aerated. These fat-containing creamy frostings have the ability to incorporate air from about 50 percent to about 120 percent of the volume of the ingredients. This results in frosting densities of as little as 0.4 to 0.6 grams/cubic centimeter. The creamy frostings of the present invention differ from prior creamy frostings in that they have a unique marshmallowy-type texture and mouth feel. However, the creamy frostings of the present invention maintain or surpass the following qualities of non-aerated creamy frostings: creamy texture, melt-in-the-mouth properties, high viscosity, and aging and heat stability.

The following examples illustrate the shortening and frosting compositions of this invention, but the invention is not limited to these specific examples.

Example I

The following ingredients were melted, blended together, and then rapidly cooled to room temperature: 8 percent propylene glycol monostearate; 10 percent of a polyglycerol ester containing an average of about 10 glycerol units and an average of about 3.8 esterified hydroxyl groups, the fatty acid composition of the esters being 60% $C_{18}$, 28% $C_{16}$, and 12% $C_{22}$; 1.2% polyoxyethylene (20) sorbitan monostearate, and 1.8% sorbitan monostearate; and 79 percent of refined and bleached soybean oil with an Iodine Value of 107. The blended mixture, when cooled, became the shortening of the present invention.

Fifty grams of the above-described shortening, 250 grams of sucrose, 10 grams of dextrose, 2 grams of salt, and 90 grams of 110°F water were placed in a mixing bowl. The ingredients were pre-mixed at low speed for 1 minute and then mixed for 3 minutes at high speed. The frosting had a density of 0.43 grams/cubic centimeter. When spread on a cake, the frosting exhibited good peaking, good eating quality, and adequate stability at 90°F when left uncovered overnight.

Example II

The procedure of Example I was repeated except that the following ingredients were used to make the shortening: 8 percent propylene glycol monostearate; 10 percent of a polyglycerol ester containing an average of about 10 glycerol units and an average of about 3.8 esterified hydroxyl groups, the fatty acid composition of the esters being 0.4% $C_{14}$, 25% $C_{16}$, 60% $C_{18}$, 1.6% $C_{20}$, and 13% $C_{22}$; 1.5% polyoxyethylene (20) sorbitan monostearate and 1.0% polyoxethylene (20) sorbitan tristearate; and 79.5% of refined and bleached soybean oil with an Iodine Value of 107.

The density of the frosting was 0.50 gram/cubic centimeter. When spread on a cake, the frosting exhibited good peaking, good eating quality, and adequate stability at 90°F when stored uncovered overnight.

What is claimed is:

1. A shortening composition for use in an aerated creamy frosting which comprises:

a. from about 5 percent to about 12 percent of a propylene glycol monoester, wherein at least 50 percent of the ester groups are stearate esters, 0 to 50 percent of the ester groups are palmitate esters, and 0 to 15 percent of the ester groups are behenate esters;
   b. from about 6 percent to about 10 percent of a partial ester of polyglycerol wherein the polyglycerol contains an average of from 6 to 12 glycerol units and from 20 to 40 percent of the free hydroxyl groups are esterified with a fatty acid, said fatty acid comprising at least 50 percent stearic acid and 0 to 50 percent palmitic acid;
   c. from about 1.5 percent to about 4 percent of an emulsifier selected from the group consisting of polyoxyethylene sorbitan tristearate, mixtures of polyoxyethylene sorbitan monostearate and sorbitan monostearate wherein the polyoxyethylene sorbitan monostearate comprises at least 25 percent of the total mixture, and mixtures of polyoxyethylene sorbitan tristearate, polyoxyethylene sorbitan monostearate, and sorbitan monostearate wherein the polyoxyethylene ester compounds comprise at least 25 percent of the total mixture; and
   d. from about 77.5 percent to about 87.5 percent of a glyceride-based oil or fat.

2. The shortening of claim 1 wherein the ingredients comprise:

a. from about 6 percent to about 8 percent propylene glycol monostearate;
   b. from about 7 percent to about 9 percent of partial stearic acid esters of polyglycerol wherein the polyglycerol contains an average of about 10 glycerol units and an average of 2.4 to 4.8 stearic acid groups;
   c. from about 2 percent to about 2.5 percent polyoxyethylene (20) sorbitan tristearate; and
   d. from about 77.5 percent to about 87.5 percent of refined and bleached soybean oil having an iodine value of 70 to 115.

3. A creamy frsoting having a density of from 0.4 to 0.6 grams/cubic centimeter comprising from about 45 percent to about 75 percent sugar, from about 10 percent to about 25 percent water, and from about 6 percent to about 15 percent of the shortening composition of claim 2.

4. A creamy frosting having a density of from 0.4 to 0.6 grams/cubic centimeter comprising from about 45 percent to about 75 percent sugar, from about 10 percent to about 25 percent water, and from about 6 percent to about 15 percent of the shortening composition of claim 1.

* * * * *